United States Patent
Hwang et al.

(10) Patent No.: US 9,368,790 B2
(45) Date of Patent: Jun. 14, 2016

(54) METHOD FOR MANUFACTURING A COMPOSITE

(71) Applicant: National Taiwan University of Science and Technology, Taipei (TW)

(72) Inventors: Bing Joe Hwang, Taipei (TW); Yun Sheng Ye, Taipei (TW); Wei Nien Su, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 158 days.

(21) Appl. No.: 14/160,741

(22) Filed: Jan. 22, 2014

(65) Prior Publication Data

US 2014/0203221 A1    Jul. 24, 2014

(30) Foreign Application Priority Data

Jan. 24, 2013   (TW) .............................. 102102721 A

(51) Int. Cl.
*H01B 1/24*     (2006.01)
*C01B 31/04*    (2006.01)
*B82Y 30/00*    (2011.01)
(Continued)

(52) U.S. Cl.
CPC .............. *H01M 4/364* (2013.01); *H01M 4/386* (2013.01); *H01M 4/387* (2013.01); *H01M 4/625* (2013.01)

(58) Field of Classification Search
CPC .......... H01B 1/24; B82Y 30/00; B82Y 40/00; C01B 31/04

USPC ........ 252/500, 502, 510, 520.1, 520.2, 521.3; 106/316; 423/445 R, 445 B, 447.1; 977/734, 755, 778, 779, 788, 842, 896
See application file for complete search history.

(56) References Cited

U.S. PATENT DOCUMENTS

2014/0113200 A1*   4/2014   Seymour ................ H01G 11/38
                                                        429/231.8

FOREIGN PATENT DOCUMENTS

| CN | 102343239 A | 2/2012 |
| CN | 102437320 A | 5/2012 |

(Continued)

OTHER PUBLICATIONS

Park ("Effect of carbon blacks filler addition on electrochemical behaviors of Co3O4/graphene nanosheets as a supercapacitor electrodes." Electro Acta, 89, pp. 516-522, online Nov. 27, 2012).*

(Continued)

*Primary Examiner* — Tri V Nguyen
(74) *Attorney, Agent, or Firm* — The PL Law Group, PLLC

(57) ABSTRACT

A method for manufacturing a composite is disclosed. The method includes steps of (a) providing a powder in a first weight ratio, a graphene oxide in a second weight ratio, a first modifying agent having a first electric charge, and a second modifying agent having a second electric charge; (b) reacting the first modifying agent with the powder so that a surface of the powder has the first electric charge; (c) reacting the second modifying agent with the graphene oxide so that a surface of the graphene oxide has the second electric charge; and (d) mixing the powder having the first electric charge and the graphene oxide having the second electric charge to form a composite, wherein the first and the second electric charges are of opposite electrical polarities.

12 Claims, 7 Drawing Sheets

(51) Int. Cl.
*B82Y 40/00* (2011.01)
*H01M 4/36* (2006.01)
*H01M 4/62* (2006.01)
*H01M 4/38* (2006.01)

(56) References Cited

FOREIGN PATENT DOCUMENTS

| CN | 102496719 A | 6/2012 |
|---|---|---|
| WO | 2011/141486 A1 | 11/2011 |

OTHER PUBLICATIONS

Zhu ("Layer-by-Layer Self-Assembly for Constructing a Graphene/Platinum Nanoparticle Three-Dimensional Hybrid Nanostructure Using Ionic Liquid as a Linker." Langmuir, 26(10), pp. 7614-7618, web Jan. 14, 2010).*

Office Action issued on Sep. 6, 2015 for the corresponding PRC Patent application.

Office Action Issued on Nov. 10, 2014 from the TW Patent Office.

* cited by examiner

METHOD FOR MANUFACTURING A COMPOSITE

CROSS-REFERENCE TO RELATED APPLICATION AND CLAIM OF PRIORITY

The application claims the benefit of the Taiwan Patent Application No. 102102721, filed on Jan. 24, 2013, at the Taiwan Intellectual Property Office, the disclosures of which are incorporated herein in their entirety by reference.

FIELD OF THE INVENTION

The present invention relates to a method for manufacturing a composite. In particular, the present invention relates to a method for manufacturing a silicon/graphene composite.

BACKGROUND OF THE INVENTION

An anode of a lithium ion (Li-ion) battery having high power as presently commercialized is mostly made of graphite. However, the theoretic electric capacity is only up to about 372 mAh/g. In order to overcome the limitation resulting from the insufficiency of the electric capacity, studies to find a novel anode are widely developing. However, no matter which of a tin-based or a silicon-based material is used for an anode, the fact that the dramatic volume expansion and shrinkage caused by lithium ion insertion and extraction during charging and discharging of the battery becomes the biggest hindrance to successfully commercialize the alloyed materials used for an anode at present. The main reason why silicon-based material is given the most effort to develop as a material for an anode applicable to a Li-ion battery versus other suitable materials is its abundance in the earth's crust and its intrinsically high theoretical capacity (4200 mAh/g). However, the anode tends to deteriorate and break so that the structure of the anode is easily fractured and pulverized. After several cycles of charging and discharging the battery, the electric capacity of the battery is rapidly decreased to an almost fully consumed extent. Therefore, these disadvantages restrict the material's possible commercial applications.

In order to overcome the problem caused by the high variation in volume, a method commonly used in the technical field is to coat a silicon powder with a conductive carbon. This method can efficiently reduce the shrinkage ratio in volume of the silicon powder and improve the problem of poor conductivity of silicon as well. It would be the most beneficial way for the purpose of cost reduction. Graphene is a mono layer of graphite with a perfect sp2 configuration and a two-dimensional flat plane structure. Recent progress in research shows that graphene exhibits a lot of particular properties such as high mechanical strength, high specific surface area, high electron conductivity and good chemical stability, so that it has been used in several energy technology applications. In the prior art, silicon and graphene were combined in order to prepare a silicon/graphene composite which was applied to the anode of the Li-ion battery. The graphene contained in the composite acts as a buffer layer, improves the poor conductivity of silicon, and improves the stability of the cycle performance of the battery during charging and discharging.

Although the stability of charging and discharging the battery can be improved when silicon powder appears in a form of the composite, the problem presently encountered is that the silicon powder is still unable to be uniformly dispersed on the layers of graphene. This unavoidably causes the deterioration of the electric capacity that accompanies the cycles of charging and discharging the battery.

The addition of some appropriate additives or the use of a chemical functionalization method can be used to improve the poor dispersion of silicon on the graphene layers. However, these methods significantly increase the cost of the material synthesis significantly. Therefore, there is an urgent need to provide a simple, low-cost method to improve the dispersion of silicon powder.

SUMMARY OF THE INVENTION

In accordance with an aspect of the present invention, a method for manufacturing a composite is disclosed. The method includes steps of (a) providing a powder in a first weight ratio, a graphene oxide in a second weight ratio, a first modifying agent having a first electric charge, and a second modifying agent having a second electric charge; (b) reacting the first modifying agent with the powder so that a surface of the powder has the first electric charge; (c) reacting the second modifying agent with the graphene oxide so that a surface of the graphene oxide has the second electric charge; and (d) mixing the powder having the first electric charge and the graphene oxide having the second electric charge to form a composite, wherein the first and the second electric charges have opposite electrical polarities.

Preferably, the method further includes a step of (c1) reducing at least a first part of the graphene oxide into a graphene by a reducing agent to form the composite.

Preferably, the reducing agent is hydrazine.

Preferably, the surface of the powder has an oxide formed thereon, and the method further includes a step of (a1) removing the oxide using a deoxidizing agent.

Preferably, the deoxidizing agent includes hydrofluoric acid.

Preferably, the method further includes a step of (a2) removing the deoxidizing agent remaining on the surface of the powder using isoamyl nitrite.

Preferably, the step (b) for reacting the first modifying agent with the powder takes place in a first solvent, and the first solvent is acetonitrile.

Preferably, the method further includes a step of (e) reducing at least a second part of the graphene oxide into graphene to form the composite.

Preferably, the step of reducing the second part of the graphene oxide takes place by heating the graphene oxide to a temperature between 500° C. and 700° C.

Preferably, the powder is a nano-particle.

Preferably, the powder is one selected from a group consisting of silicon powder, germanium powder, tin powder and a combination thereof.

Preferably, the first modifying agent is an aromatic compound and the second modifying agent is a poly ionic liquid (PIL).

Preferably, the aromatic compound is 4-aminobenzoic acid.

Preferably, the first weight ratio is in the range of 50%~75% and the first weight ratio plus the second weight ratio is 100%.

In accordance with another aspect of the present invention, a composite containing powder is disclosed. The composite includes a surface of a powder having a first electric charge and a surface of a graphene having a second electric charge, wherein the first and the second electric charges have opposite electrical polarities.

Preferably, the powder is one selected from a group consisting of silicon powder, germanium powder, tin powder and a combination thereof.

Preferably, the powder contained in the graphene-contained composite ranges between 50 wt % and 90 wt %.

In accordance with a further aspect of the present invention, a method for modifying a powder is disclosed. The method includes steps of (a) providing a modifier with an electric charge, and (b) distributing the modifier on a surface of a powder so that the surface of the powder has the electric charge.

Preferably, the modifier is chemically bonded to the surface of the powder.

In accordance with another further aspect of the present invention, a method for modifying a powder is disclosed. The method includes steps of (a) providing a modifying agent having a first free radical and an electric charge, (b) providing a powder having a second free radical, and (c) causing the first free radical to be bound with the second free radical so as to enable the powder to have the electric charge.

The above objectives and advantages of the present invention will become more readily apparent to those ordinarily skilled in the art after reviewing the following detailed descriptions and accompanying drawings.

DETAILED DESCRIPTION OF THE PREFERRED EMBODIMENT

Figure 1A:
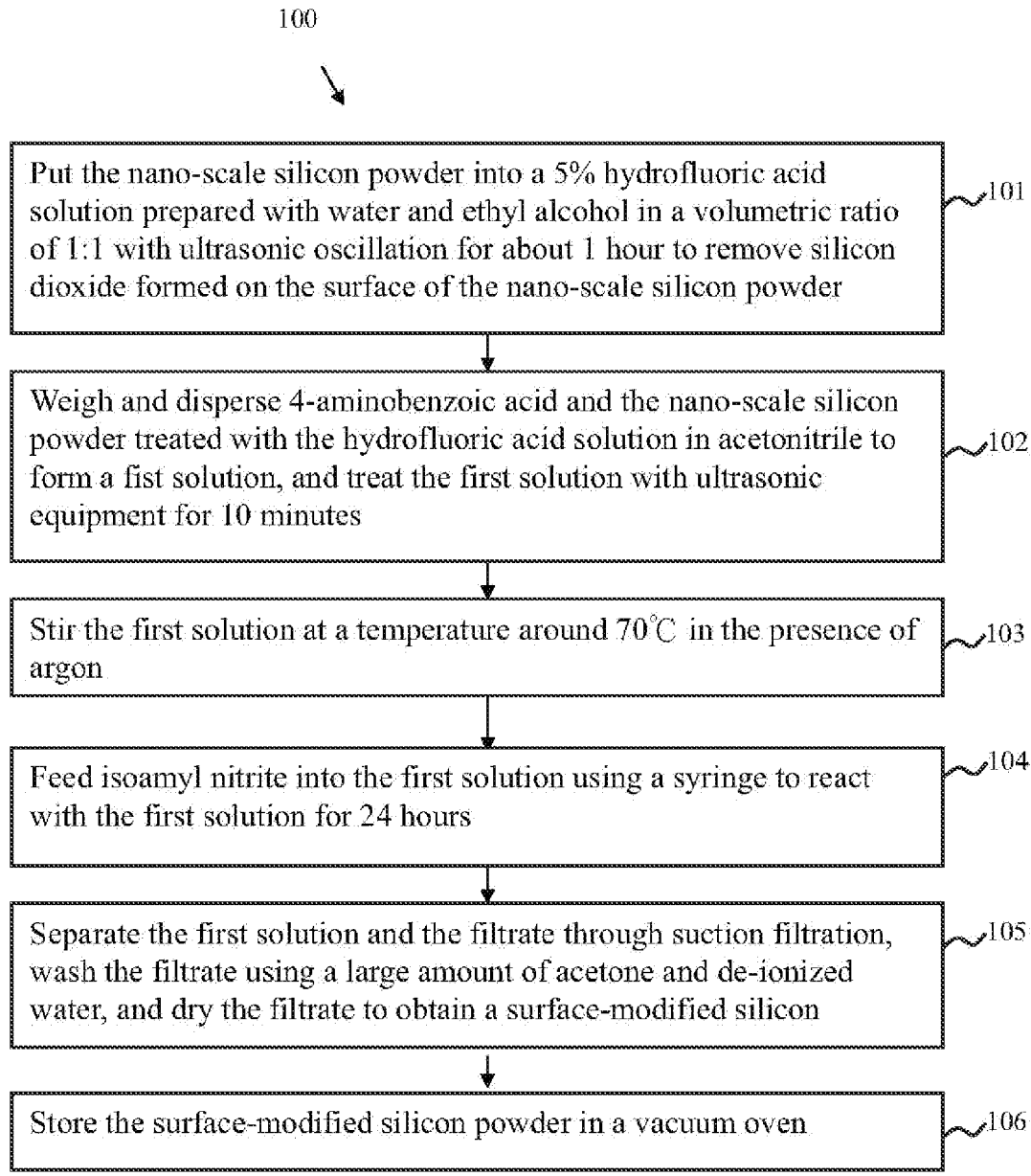
FIG. 1A is a flow diagram according to a first embodiment of the present invention.

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

The present invention takes place through an electric charge adhesion method, which is a non-covalent bonding method, to modify a surface of a powder. The present invention uses graphene oxide and commercialized nano-scale silicon particles as initializing materials. A polymer having positive charges is used to modify the surface of the graphene oxide so that the positive charges adhere to the surface of the graphene oxide. In addition, the surface of the silicon powder is modified by a chemical method so that negative charges adhere thereto. Because of the attractive force between the positive and negative charges, the silicon powder with the negative charges and the graphene oxide with the positive charges can consequently form a uniformly dispersed mixture. Then, the graphene oxide is reduced into graphene by way of a high temperature reduction method to improve the problem of poor conductivity of the graphene oxide. Thus, a uniformly dispersed silicon/graphene composite is created. The present invention can also be applied to a surface of any material required to be modified in a form of, for example, a powder, nano-scale powder, grain, particle, nano-particle, or the combination thereof.

By using the simple electric charge adhesion method described above, a silicon/graphene composite having different silicon ratios can be promptly prepared. In comparison with the prior art, the method using the simple electric charge adhesion method, without the necessity of covalently bonding the silicon powder to the graphene, can cause the silicon powder to uniformly adhere to the surface of each graphene layer to avoid the problems of re-stacking of graphene and the aggregation of the silicon powder. Hence, the electric capacity and the stability of the charging and discharging characteristics of a battery can be effectively improved.

According to an embodiment of the present invention, the first modifying agent can be an aromatic compound. The aromatic compound can be 4-aminobenzoic acid which provides a first free radical, which is a benzoic acid free radical, so that the benzoic acid free radical can be distributed to the surface of the powder having a second free radical thereon. In addition, as described below, a second modifying agent can be a poly ionic liquid (PIL), a reducing agent can be acetonitrile, a first solvent can be acetonitrile, an ester can be isoamyl nitrite, a second solvent can be de-ionized water, and the graphene oxide can be prepared by one of the Hummer method and the modified Hummer method.

The graphene oxide prepared by the Hummer method is obtained by oxidization of graphite powder treated with a water-free mixture of concentrated sulfuric acid, sodium nitrate and potassium permanganate. The modified Hummer method differs from the Hummer method in that the application ratio of graphite to sodium nitrate is different.

Figure 1B:
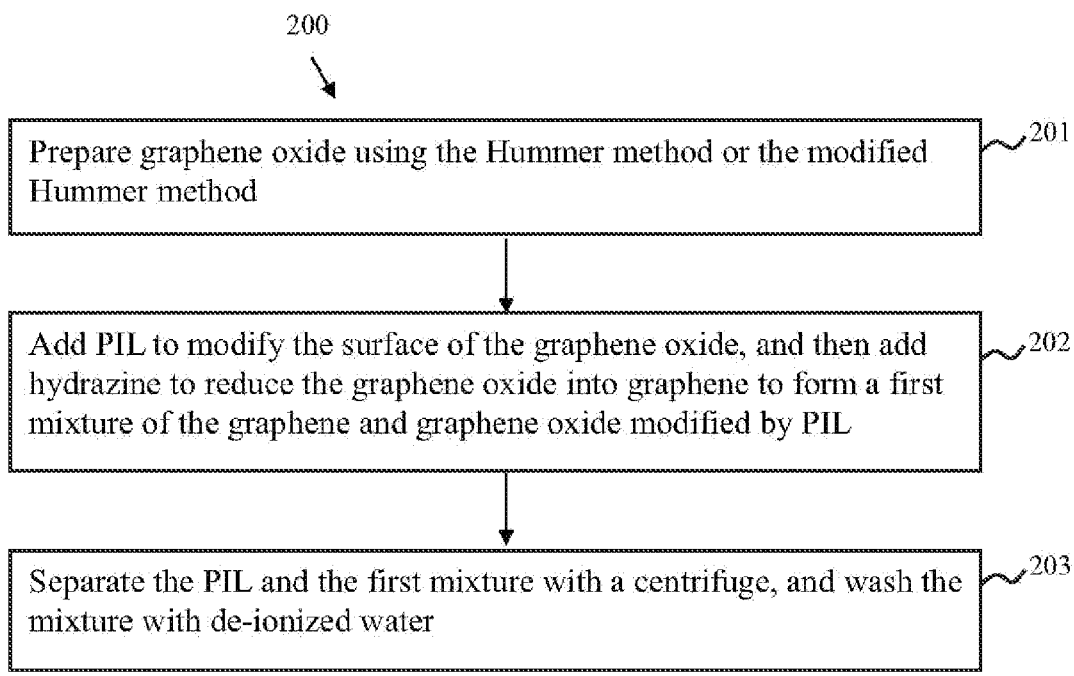
FIG. 1B is a flow diagram according to a second embodiment of the present invention.
Figure 1C:
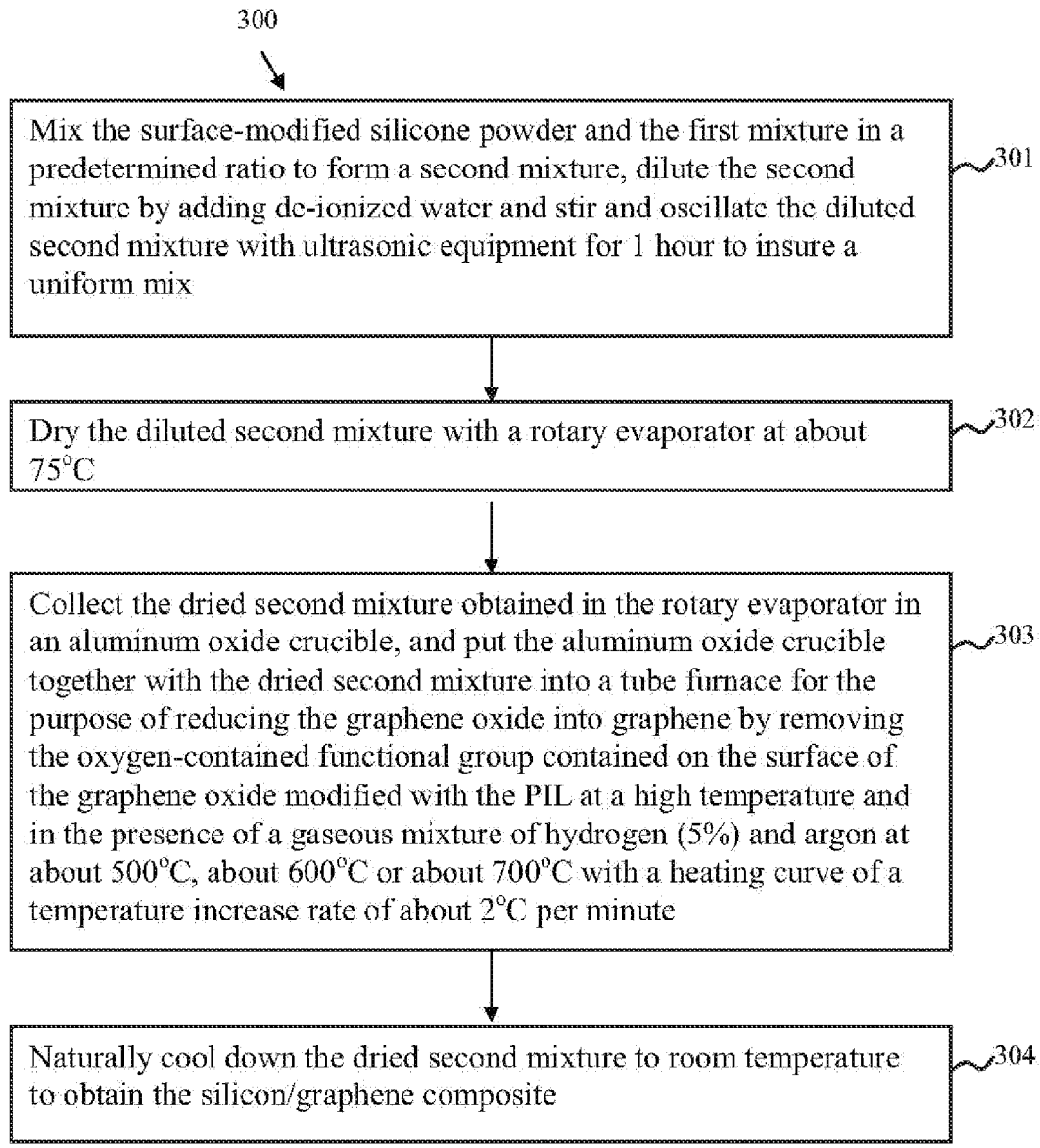
FIG. 1C is a flow diagram according to a third embodiment of the present invention.

Please refer to FIGS. 1(A)~1(C). The flow diagram 100 shown in FIG. 1(A) is a surface modification method applied to nano-scale silicon powder, which includes the steps of putting the nano-scale silicon powder into a 5% hydrofluoric acid solution prepared using water and ethyl alcohol in a volumetric ratio of 1:1 with ultrasonic oscillation for about 1 hour to remove the silicon dioxide formed on the surface of the nano-scale silicon powder (step 101); weighing and dispersing 1.64 g of 4-aminobenzoic acid, which is the first modifying agent, and 300 mg of the nano-scale silicon powder treated with the hydrofluoric acid solution to 60 ml of acetonitrile, which is the first solvent, in a reactor to form a first solution which is further oscillated with the ultrasonic equipment for 10 minutes (step 102); stirring the first solution in the reactor at a temperature around 70° C. in the presence of influent argon to prevent oxidization of the silicon powder because of the presence of oxygen (step 103); feeding 5 ml of isoamyl nitrite, which is the ester, into the first solution using a syringe to react with the first solution for 24 hours (step 104); pouring the first solution containing isoamyl nitrite into a suction flask and separating and collecting the filtrate remaining at the top of the suction flask with the assistance of suction filtration while collecting a filtrated first solution at the bottom of the suction flask, washing the filtrate at the top of the suction flask using a large amount of acetone and de-ionized water until the filtrated first solution collected at the bottom of the suction flask becomes colorless, and then drying the filtrate to obtain a surface-modified silicon powder (step 105); and storing the surface-modified silicon powder in a vacuum oven for further applications (step 106).

In step 102, the surface of the silicon powder is originally adhered with at least a hydrogen radical. When a silicon powder reacts with the 4-aminobenzoic acid with a minus electric charge, the amino group of the 4-aminobenzoic acid is detached so that a benzoic acid free radical, which is the first free radical, is formed, and the hydrogen radical will be detached from the surface of the silicon powder so that a second free radical is formed on the surface of the silicon powder. The benzoic acid free radical and the second free radical on the surface of the silicon powder bond to each other chemically so that at least one of the benzoic acid is distributed to the surface of the silicon powder. Accordingly, the 4-aminobenzoic acid and a negative electric charge originally from the 4-aminobenzoic acid are distributed to the surface of the silicon powder. From a macro point of view, the silicon powder with the benzoic acid distributed to its surface has the equivalent negative electric charge.

Because the silicon powder is treated by hydrofluoric acid in advance, there is a possibility that hydrofluoric acid residue will remain in the silicon powder. Therefore, after adding acetonitrile to the silicon powder in step 102, there is a possibility that cyanide will form when acetonitrile meets the hydrofluoric acid. To prevent the risk of being harmful to the person who carries out the steps, step 104 is necessary to remove the residue of cyanide and lower the possibility of human injury. Isoamyl nitrite is one of the best alternatives and is usually used to prevent cyanide poisoning of people. Therefore, the purpose of the addition of isoamyl nitrite is for environmental and general safety considerations.

The flow diagram 200 shown in FIG. 1(B) depicts a method for modifying a surface of a graphene oxide, which includes the steps of preparing a graphene oxide by the Hummer method or the modified Hummer method (step 201); adding a second modifying agent, which could be a poly ionic liquid (PIL) used in an embodiment of the present invention, to the graphene oxide to modify a surface of the graphene oxide, and then adding a reducing agent, which could be hydrazine used in an embodiment of the present invention, to reduce at least one part of the graphene oxide into a graphene so that a first mixture containing the graphene and the graphene oxide modified by the PIL is formed in the PIL (step 202); separating the PIL and the first mixture with a centrifuge, and washing the first mixture using de-ionized water (step 203).

Both of the graphene oxide and the graphene exist in the form of a sheet. The PIL is a liquid having a positive electric charge. When the PIL reacts with the graphene oxide and the graphene in step 202, the PIL and the positive electric charge contained on the PIL will bond to the surface of the graphene oxide and the surface of the graphene. From a macro point of view, the graphene oxide with the PIL bonded to its surface and the graphene with the PIL bonded to its surface both have the equivalent negative electric charge.

The flow diagram 300 shown in FIG. 1(C) depicts a method for preparing a composite containing a silicon and a graphene, which includes the steps of mixing the surface-modified silicone powder and the first mixture containing the graphene oxide and the graphene modified by the PIL in a predetermined ratio to form a second mixture, diluting the second mixture by adding a second solvent such as de-ionized water to reach a concentration of 5 mg/ml, and stirring and oscillating the diluted second mixture with ultrasonic equipment for 1 hour to ensure a uniform mix of the surface-modified silicone powder to the graphene oxide and the graphene modified by PIL in the second mixture (step 301); drying the diluted second mixture with a rotary evaporator at about 75° C. (step 302); collecting the dried second mixture obtained in the rotary evaporator in an aluminum oxide crucible, and putting the aluminum oxide crucible together with the dried second mixture into a tube furnace for the purpose of reducing the graphene oxide into graphene by removing the oxygen-contained functional group contained on the surface of the graphene oxide modified by the PIL at a high temperature and in the presence of gaseous mixtures of hydrogen (5%) and argon at about 500° C., about 600° C. or about 700° C. with a heating curve of a temperature increase rate of about 2° C. per minute, wherein the heating curve can be a single stage curve or a multiple stage curve (step 303); and naturally cooling down the dried second mixture to room temperature to obtain the silicon/graphene composite (step 304).

In step 301, the surface of the modified silicon powder has the negative charge, and the surfaces of the graphene and the graphene oxide modified by the PIL have the positive charge, so that the silicon powder and the modified graphene or the modified graphene oxide attract each other because of the attraction force between the opposite charges, without the necessity of forming any chemical bond between them. Accordingly, the silicon powder is uniformly distributed and adheres to the surface of the graphene and/or graphene oxide, and the phenomena of restacking the graphene and/or graphene oxide and the aggregation of the silicon powder are avoided. Therefore, a good dispersion of the silicon powder in the graphene and/or graphene oxide is obtained. After the silicon powder and the graphene and/or graphene oxide are used to manufacture a battery, the electric capacity and the stability of the cyclical charging and discharging property of the battery are more effectively improved.

Figure 2A:
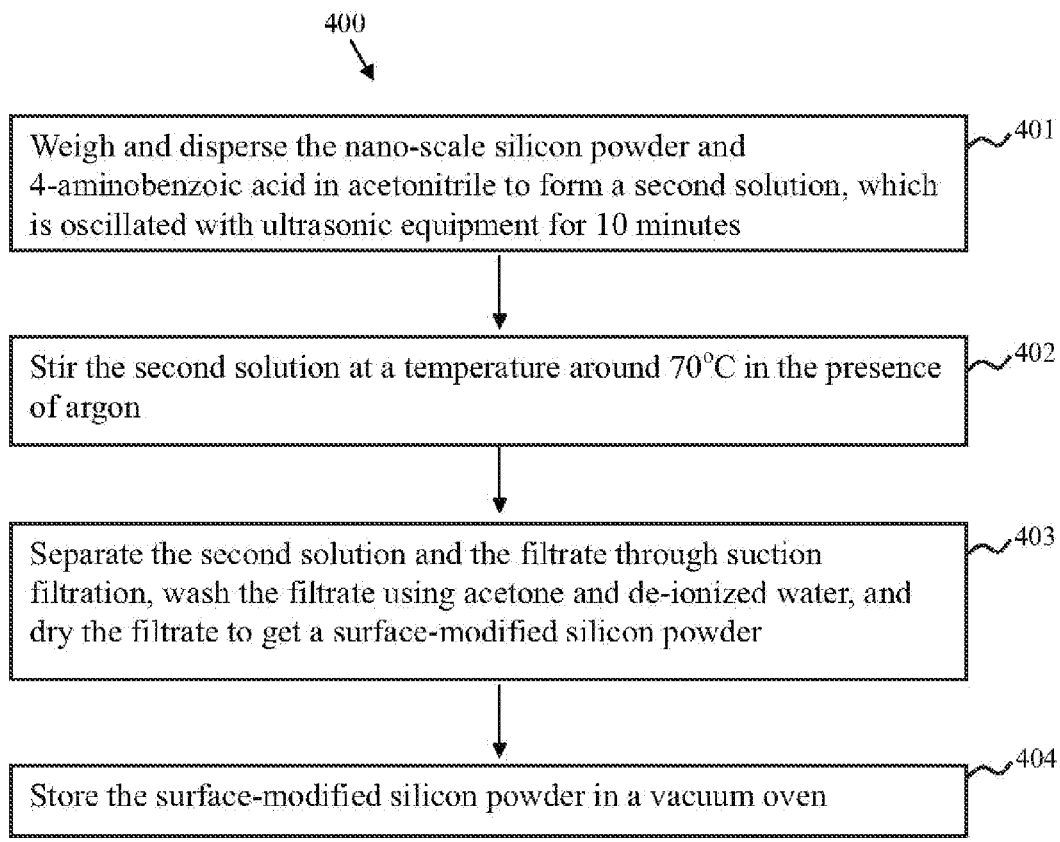
FIG. 2A is a flow diagram according to a fourth embodiment of the present invention.
Figure 2B:
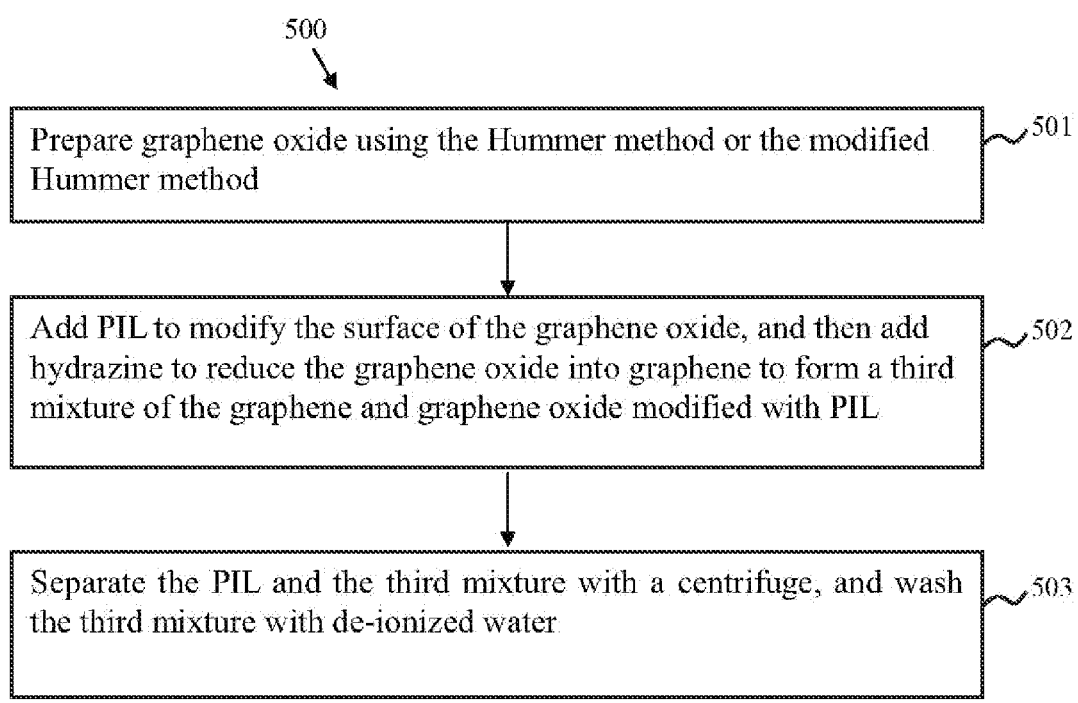
FIG. 2B is a flow diagram according to a fifth embodiment of the present invention.
Figure 2C:
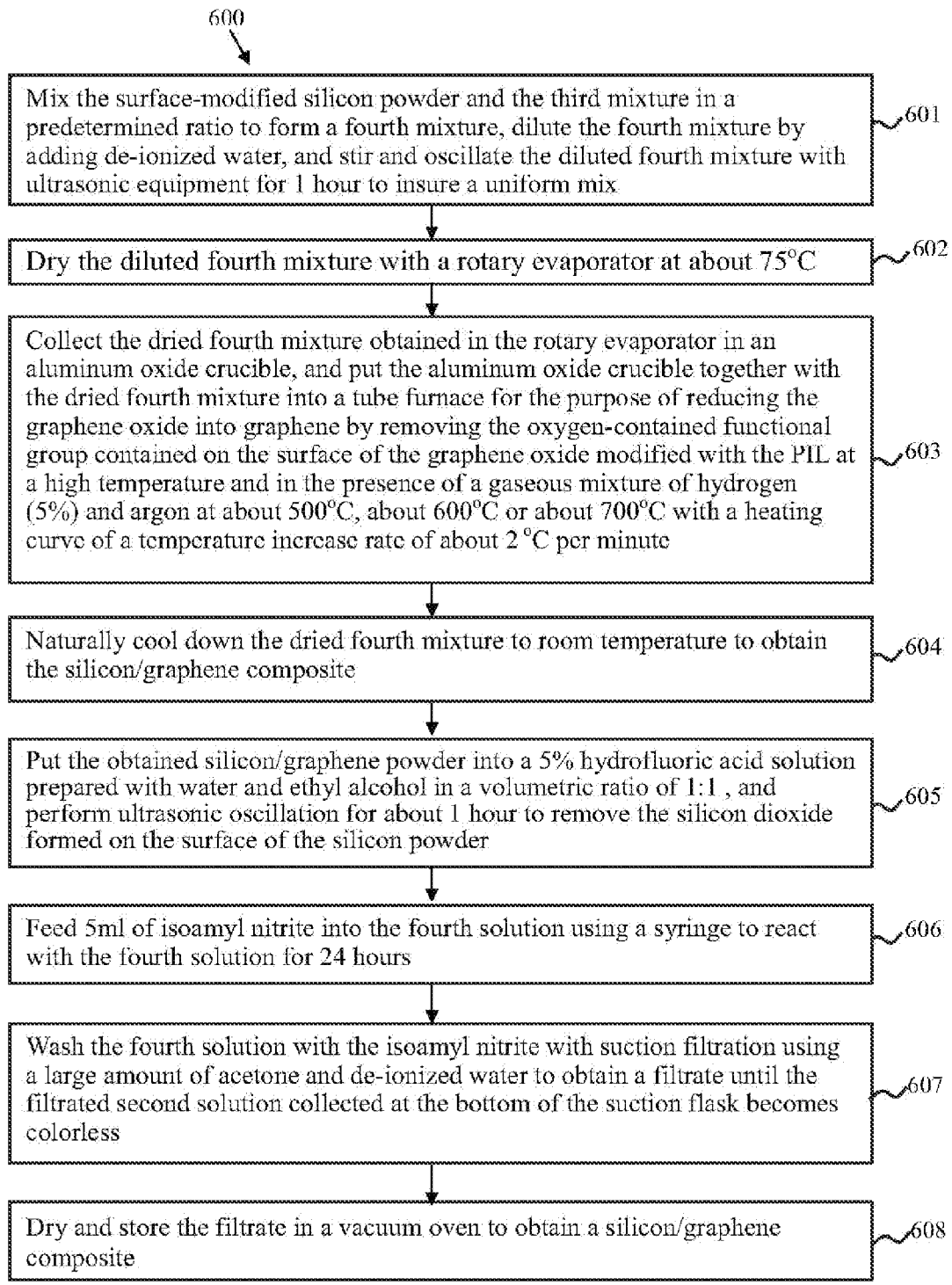
FIG. 2C is a flow diagram according to a sixth embodiment of the present invention.

As shown in FIGS. 2(A)~2(C), the step of using hydrofluoric acid to remove the silicon oxide formed on the surface of the silicon powder can be done in a later step. The flow diagram 400 shown in FIG. 2(A) depicts a method for modifying the surface of the silicon powder, which includes the steps of weighing and dispersing 300 mg of the nano-scale silicon powder and 1.64 g of 4-aminobenzoic acid in a reactor having therein 60 ml of acetonitrile to form a second solution, which is further oscillated with ultrasonic equipment for 10 minutes (step 401); stirring the second solution in the reactor at a temperature around 70° C. in the presence of influent argon to prevent an oxidization of the silicon powder because of the presence of oxygen (step 402); pouring the second solution into a suction flask and separating and collecting a filtrate remaining at the top of the suction flask with assistance of the suction filtration while collecting a filtrated second solution at the bottom of the suction flask, washing the filtrate at the top of the suction flask using a large amount of acetone and de-ionized water until the filtrated second solution collected at the bottom of the suction flask becomes colorless, and drying the filtrate to form a surface-modified silicon powder (step 403); and storing the surface-modified silicon powder in a vacuum oven for further applications (step 404).

The flow diagram 500 shown in FIG. 2(B) depicts a method for modifying a surface of a graphene oxide, which includes the steps of preparing a graphene oxide by the Hummer method or the modified Hummer method (step 501); adding a poly ionic liquid (PIL) to the graphene oxide to modify a surface of the graphene oxide, and further adding hydrazine to reduce at least one part of the graphene oxide into a graphene so that a third mixture containing the graphene and the graphene oxide modified by the PIL is formed in the PIL (step 502); separating the PIL and the third mixture with a centrifuge, and washing the third mixture using de-ionized water (step 503).

The flow diagram 600 shown in FIG. 2(C) depicts a method for preparing a composite containing a silicon and a graphene, which includes the steps of mixing the surface-modified silicone powder and the third mixture containing the graphene oxide and the graphene modified by the PIL in a predetermined ratio to form a fourth mixture, diluting the fourth mixture by adding de-ionized water, and stirring and oscillating the diluted fourth mixture with ultrasonic equipment for 1 hour to ensure a uniform mix of the surface-modified silicone powder to the graphene oxide and the graphene modified by PIL in the second mixture (step 601); drying the diluted second mixture with a rotary evaporator at about 75° C. (step 602); collecting the dried fourth mixture obtained in the rotary evaporator in an aluminum oxide crucible, and putting the aluminum oxide crucible together with the dried fourth mixture into a tube furnace for the purpose of reducing the graphene oxide into graphene by removing the oxygen-contained functional group contained on the surface of the graphene oxide modified by the PIL at a high temperais prepared from the silicon powder and the graphene oxide mixed in a weight ratio of 67:33, the specific capacity of the battery made from the composite after encountering 100 cycles of charging and discharging still remains about 500 mAh/g and the deterioration ratio is merely 40%. The cyclical charging and discharging properties of the composites made from different weight ratios of the silicon powder and graphene oxide are summarized and listed in Table 1 below. The content of the silicon contained in the composite can be quantitatively analyzed by a thermogravimetric analyzer (TGA) or an energy dispersive x-ray spectrometer (EDX or EDS), and is also summarized in Table 1.

TABLE 1

| Mixing ratio of silicon:graphene oxide (weight ratio) | Content of silicon in composite, measured by TGA analysis (weight percent) | Initial electric capacity (mAh/g) | Electric capacity after 50 cycles of charging and discharging (mAh/g) | Deterioration ratio | Electric capacity after 80 cycles of charging and discharging (mAh/g) | Deterioration ratio |
|---|---|---|---|---|---|---|
| 50:50 | about 65% | 910 | 530 | 42% | 580 | 36% |
| 67:33 | about 77% | 830 | 735 | 11% | 570 | 31% |
| 75:25 | about 85% | 820 | 945 | −15% | 810 | 1% |
| 100:0 | 100% | 2100 | 150 | 93% | (not tested) | (not tested) | ture and in the presence of gaseous mixtures of hydrogen (5%) and argon at about 500° C., about 600° C. or about 700° C. with a heating curve of a temperature increase rate of about 2° C. per minute, wherein the heating curve can be a single stage curve or a multiple stage curve (step 603); naturally cooling down to room temperature to obtain the silicon/graphene powder (step 604); and removing the silicon dioxide formed on the surface of the silicon powder by putting the obtained silicon/graphene powder into a 5% hydrofluoric acid solution of water and ethyl alcohol in a volumetric ratio of 1:1, and performing ultrasonic oscillation for about 1 hour (step 605). Regarding the above-mentioned method, an additional step of feeding 5 ml of isoamyl nitrite into the second solution using a syringe to react with the second solution for 24 hours can be added to remove the residual hydrofluoric acid to prevent the formation of cyanide when acetonitrile meets the hydrofluoric acid (step 606). The above-mentioned method can be further modified with the additional steps of washing the second solution added with the isoamyl nitrite through suction filtration using a large amount of acetone and de-ionized water to obtain a filtrate until the filtrated second solution that collects at the bottom of the suction flask becomes colorless (step 607), and drying and storing the filtrate in a vacuum oven to obtain a silicon/graphene composite (step 608).

Figure 3:
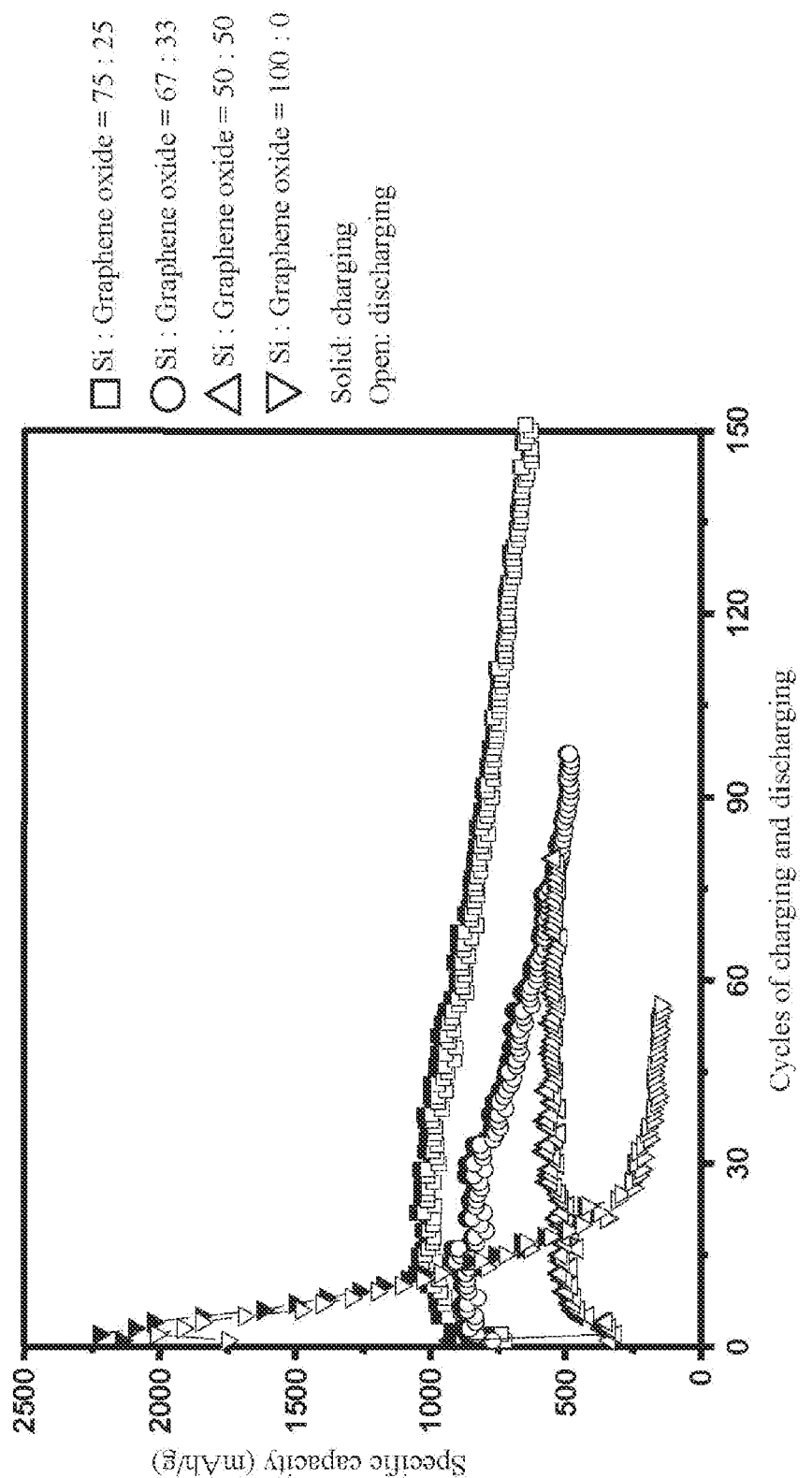
FIG. 3 is a schematic diagram showing characteristic test results of cyclical charging and discharging processes according to an embodiment of the present invention.

Please refer to FIG. 3, which shows the results of charging and discharging tests to a button-type battery assembled from an electrode which is prepared from the obtained silicon/graphene composite according to an embodiment of the present invention. As shown in FIG. 3, the reversible specific capacity reaches up to 1030 mAh/g when the composite is prepared from the silicon powder and the graphene oxide mixed in a weight ratio of 75:25. When 100 cycles of the charging and discharging are reached, the specific capacity still remains about 760 mAh/g. Even when 150 cycles of the charging and discharging are reached, the specific capacity still remains about 600 mAh/g and the deterioration ratio is merely 26%. The test data show an excellent stability of the cyclical charging and discharging properties. If the composite According to the test result shown in Table 1, it can be seen that when the weight ratio of the silicon powder contained in the composite is between 50% and 90%, especially between about 65% and 85%, a composite for a battery having excellent cyclical charging and discharging properties can be obtained.

In addition to silicon powder, germanium powder or tin powder which are in the same group with silicon in the Periodic Table can also be used in a similar method for the surface modification and for the preparation of the required composite.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A method for manufacturing a composite, comprising steps of:
   (a) providing a powder in a first weight ratio, a graphene oxide in a second weight ratio, a first modifying agent having a first electric charge, and a second modifying agent having a second electric charge;
   (b) reacting the first modifying agent with the powder so that a surface of the powder has the first electric charge;
   (c) reacting the second modifying agent with the graphene oxide so that a surface of the graphene oxide has the second electric charge; and
   (d) mixing the powder having the first electric charge and the graphene oxide having the second electric charge to form a composite, wherein the first and the second electric charges are of opposite electrical polarities, where the first modifying agent is an aromatic compound of 4-aminobenzoic acid.

2. A method for manufacturing a composite according to claim 1, further comprising a step of:
(c1) reducing at least a first part of the graphene oxide into a graphene using a reducing agent to form the composite.

3. A method for manufacturing a composite according to claim 2, wherein the reducing agent is hydrazine.

4. A method for manufacturing a composite according to claim 1, wherein the surface of the powder has an oxide formed thereon, and the method further comprises a step of:
(a1) removing the oxide using a deoxidizing agent.

5. A method for manufacturing a composite according to claim 4, wherein the deoxidizing agent includes hydrofluoric acid.

6. A method for manufacturing a composite according to claim 4, further comprising a step of:
(a2) removing the deoxidizing agent remaining on the surface of the powder using isoamyl nitrite.

7. A method for manufacturing a composite according to claim 1, wherein the step (b) for reacting the first modifying agent with the powder takes place in a first solvent, and the first solvent is acetonitrile.

8. A method for manufacturing a composite according to claim 1, further comprising a step of:
(e) reducing at least a second part of the graphene oxide into a graphene to form the composite; and
optionally further comprising a step of:
(e1) removing the oxide using a deoxidizing agent.

9. A method for manufacturing a composite according to claim 8, wherein the step of reducing the second part of the graphene oxide takes place by heating the graphene oxide to a temperature between 500° C. and 700° C.

10. A method for manufacturing a composite according to claim 1, wherein the powder is a nano-particle.

11. A method for manufacturing a composite according to claim 1, wherein the powder is one selected from a group consisting of silicon powder, germanium powder, tin powder and a combination thereof.

12. A method for manufacturing a composite according to claim 1, wherein the second modifying agent is a poly ionic liquid (PIL).

* * * * *